United States Patent
Kim et al.

(10) Patent No.: US 8,219,038 B2
(45) Date of Patent: Jul. 10, 2012

(54) METHOD AND APPARATUS FOR IMPROVING BROADCASTING RECEPTION PERFORMANCE OF PORTABLE TERMINAL

(75) Inventors: Sung Won Kim, Seoul (KR); Jae Min Seo, Suwon-si (KR); Jung Su Lee, Yongin-si (KR); Jae Kwang Lee, Suwon-si (KR); Jang Uk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 421 days.

(21) Appl. No.: 12/509,805

(22) Filed: Jul. 27, 2009

(65) Prior Publication Data

US 2010/0035540 A1    Feb. 11, 2010

(30) Foreign Application Priority Data

Aug. 7, 2008 (KR) .................. 10-2008-0077346

(51) Int. Cl.
*H04B 17/00* (2006.01)

(52) U.S. Cl. ............... 455/67.13; 455/176.1; 455/197.2; 455/213; 455/340

(58) Field of Classification Search ............... 455/3.01, 455/3.02, 3.04, 403, 63.1, 73, 161.3, 76, 455/255, 226.1, 222, 83, 33, 208, 552.1, 455/550.1, 323, 425, 67.13, 78, 176.1, 197.2, 455/234.2, 213, 217, 306, 307, 339, 262, 455/266; 725/136; 342/357.01; 370/330, 370/529, 487; 348/731, 725

See application file for complete search history.

(56) References Cited

U.S. PATENT DOCUMENTS

| 4,371,980 | A | * | 2/1983 | Erickson ...................... 455/208 |
| 4,747,160 | A | * | 5/1988 | Bossard ..................... 455/422.1 |
| 5,949,796 | A | * | 9/1999 | Kumar ......................... 370/529 |
| 2002/0047942 | A1 | * | 4/2002 | Vorenkamp et al. .......... 348/731 |
| 2006/0135071 | A1 | * | 6/2006 | Kim .............................. 455/63.1 |
| 2007/0054639 | A1 | * | 3/2007 | Bauman ........................ 455/222 |
| 2007/0207760 | A1 | * | 9/2007 | Kavadias et al. .............. 455/255 |
| 2007/0207768 | A1 | * | 9/2007 | So et al. ........................ 455/403 |
| 2007/0234396 | A1 | * | 10/2007 | Lee et al. ...................... 725/136 |
| 2008/0106464 | A1 | * | 5/2008 | Kim ........................ 342/357.01 |
| 2008/0242239 | A1 | * | 10/2008 | Wilson et al. .................. 455/83 |
| 2009/0135781 | A1 | * | 5/2009 | Vaisanen et al. ............. 370/330 |
| 2010/0173598 | A1 | * | 7/2010 | Kavadias et al. ........... 455/226.1 |

FOREIGN PATENT DOCUMENTS

| JP | 2006-014053 | 1/2006 |
| KR | 1020030064528 | 8/2003 |
| KR | 1020060105247 | 10/2006 |
| KR | 1020070082621 | 8/2007 |

* cited by examiner

*Primary Examiner* — Tan Trinh
(74) *Attorney, Agent, or Firm* — H.C. Park & Associates, PLC

(57) ABSTRACT

The present invention relates to a portable terminal, and to a method and apparatus for improving broadcasting reception performance of the portable terminal by filtering a transmission frequency of a radio frequency unit introduced to a broadcasting reception path without experiencing broadcast signal loss. The filtering can be achieved using a filter that includes a variable capacitor in the broadcasting reception path. Accordingly, the transmission frequency of the radio frequency unit may be filtered without a broadcast signal loss. A capacitance of the variable capacitor may be controlled according to the broadcast channel.

20 Claims, 4 Drawing Sheets

METHOD AND APPARATUS FOR IMPROVING BROADCASTING RECEPTION PERFORMANCE OF PORTABLE TERMINAL

CROSS REFERENCE TO RELATED APPLICATION

This application claims priority from and the benefit of Korean Patent Application No. 10-2008-0077346, filed on Aug. 7, 2008, which is hereby incorporated by reference for all purposes as if fully set forth herein.

BACKGROUND OF THE INVENTION

1. Field of the Invention

Embodiments of the present invention relate to a portable terminal, and more particularly, to a method and apparatus for improving broadcasting reception performance of a portable terminal by filtering a transmission frequency of radio frequency unit without experiencing a broadcast signal loss.

2. Description of the Background

Recently, due to growth in mobile communication and digital technology, portable terminals can provide various useful functions. For example, a portable terminal may provide functions such as sending and receiving text messages, taking photographs, listening to music, and broadcasting digital services. A digital broadcasting service is a service which may combine mobile communications service and broadcast service to enable viewing of mobile multimedia broadcasting. The digital broadcasting service may be a next generation broadcast service and may be broadcast in various transmission modes such as, for example, Digital Video Broadcasting—Handheld (DVB-H), Terrestrial-Digital Multimedia Broadcasting (T-DMB), and China Multimedia Mobile Broadcasting (CMMB).

The portable terminal can include a broadcasting receiver for digital broadcast reception and a radio frequency unit for the mobile communications service. The broadcasting receiver can be tuned to receive a transmission frequency of the radio frequency unit if the transmission of radio frequency unit is generated during the broadcasting reception. The transmission of radio frequency unit may suffer from noise such that the reception performance of broadcasting receiver is poor. In order to solve such a problem, conventionally, a band reject filter that filters the transmission frequency band of the radio frequency unit may be added in the receiving path of the broadcasting receiver. However, the band reject filter may have an insertion loss such that an output signal of the band reject filter is lower than input signal. That is, the conventional method can prevent introduction of the transmission frequency of the radio frequency unit, however reception performance may be degraded due to the insertion loss introduced by the band reject filter. Accordingly, a method for effectively filtering the transmission frequency of the radio frequency unit to the broadcasting receiver without signal loss is required.

SUMMARY OF THE INVENTION

Exemplary embodiments of the present invention provide an improved broadcasting reception performance by filtering a transmission from a radio frequency unit introduced to a receiving path of broadcasting receiver without experiencing broadcast signal loss.

Additional features of the exemplary embodiments of the invention will be set forth in the description which follows, and in part will be apparent from the description, or may be learned by practice of the exemplary embodiments of the invention.

An exemplary embodiment of the present invention discloses an apparatus for improving broadcasting reception performance of a portable terminal. The apparatus comprises a radio frequency unit, a broadcasting receiver, a filter, and a controller. The radio frequency unit transceives a radio signal. The broadcasting receiver receives a broadcast signal. The filter is positioned between the broadcasting receiver and a broadcast reception antenna. The controller controls the radio frequency unit and the broadcasting receiver. The controller is configured to confirm broadcast channel information associated with a receiving broadcast channel, and to transmit a filter control signal to the broadcasting receiver. A filtering frequency band of the filter is tuned according to the filter control signal to filter a transmission frequency of the radio signal. The filter control signal corresponds to reference data mapped to the broadcast channel information. The reference data is stored.

Another exemplary embodiment of the present invention discloses a method of improving broadcasting reception performance of a portable terminal. The method comprises activating a digital broadcasting mode, selecting a broadcast channel, and receiving a broadcast signal associated with the selected broadcast channel. The method further comprises confirming broadcast channel information associated with the broadcast channel, confirming reference data mapped to the broadcast channel information, and storing the reference data. The method further comprises generating a filter control signal corresponding to the reference data and changing a filtering frequency band of the filter. The changing comprises transmitting the filter control signal to the filter such that a transmission frequency of a radio signal transmitted from a radio frequency unit which is filtered and the broadcast signal is passed.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF ILLUSTRATED EMBODIMENTS

Figure 1:
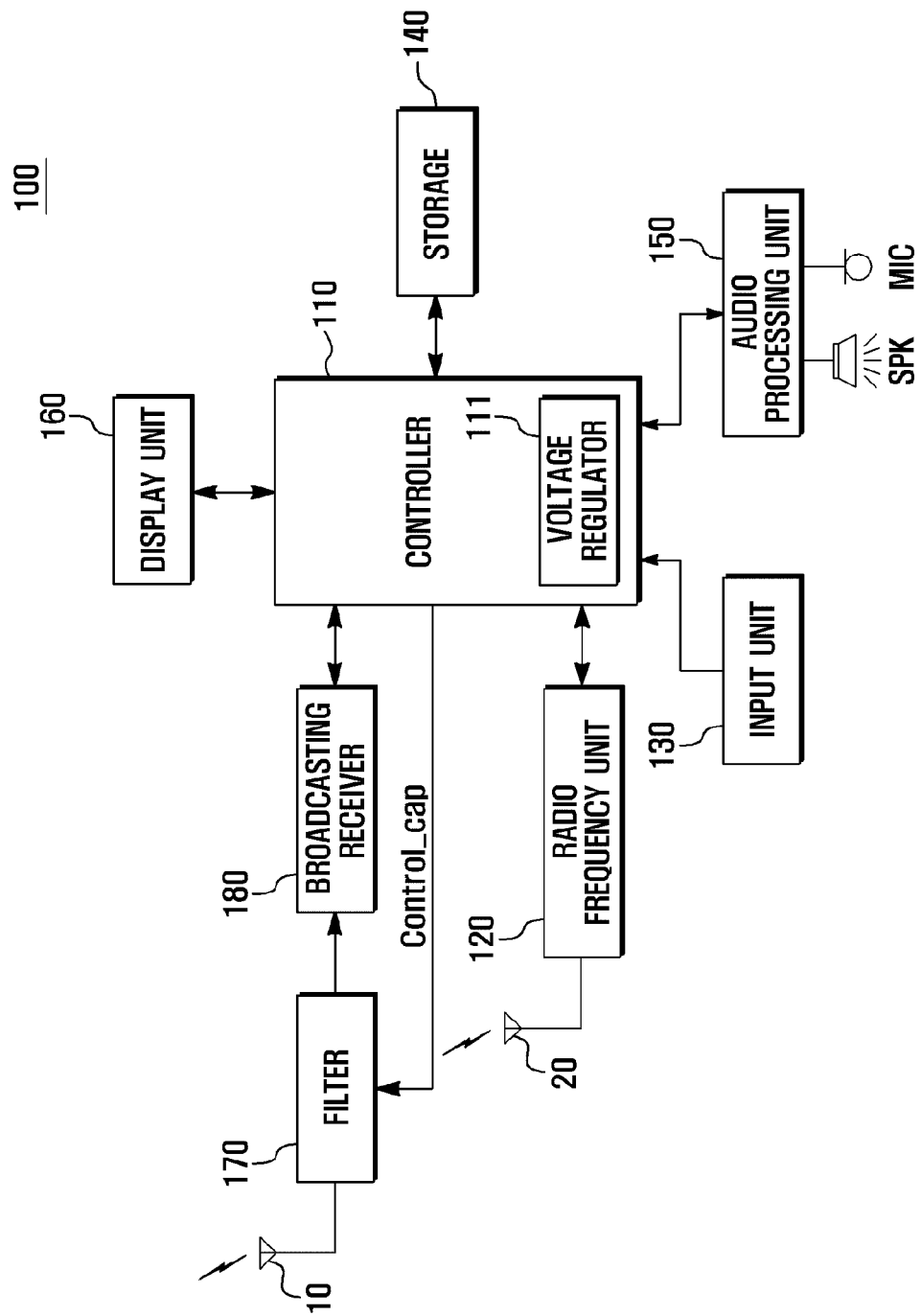
FIG. 1 is a block diagram illustrating a configuration of a portable terminal according to an exemplary embodiment of the present invention.

Embodiments of the present invention are described more fully hereinafter with reference to the accompanying drawings in which exemplary embodiments of the invention are illustrated. Embodiments of the invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the sizes and relative sizes of layers and regions may be exaggerated for clarity. Detailed descriptions of well-known functions and structures incorporated herein may be omitted to avoid obscuring the subject matter of the embodiments. Like reference numerals in the drawings denote like elements.

It will be understood that although the terms first, second, third etc. may be used herein to describe various elements, components, regions, layers and/or sections, these elements, components, regions, layers and/or sections should not be limited by these terms. These terms are used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular exemplary embodiments and is not intended to be limiting of the present invention. As used herein, the singular forms "a," "an" and "the" can include the plural forms as well, unless the context clearly indicates otherwise. It will be further understood that the terms "comprises" and/or "comprising," when used in this specification, can specify the presence of stated features, integers, steps, operations, elements, and/or components, but do not necessarily preclude the presence or addition of one or more other features, integers, steps, operations, elements, components, and/or groups thereof.

Exemplary embodiments of the invention are described herein with reference to cross-sectional illustrations that are schematic illustrations of idealized exemplary embodiments (and intermediate structures) of the present invention. As such, variations from the shapes of the illustrations as a result of, for example, manufacturing techniques and/or tolerances, are to be expected. Thus, exemplary embodiments of the present invention should not be construed as limited to the particular shapes of regions illustrated herein but can include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention are explained in detail with reference to the accompanying drawings. The same reference numbers are used throughout the drawings to refer to the same or like parts. Detailed descriptions of well-known functions and structures incorporated herein may be omitted to avoid obscuring the subject matter of the present invention.

Exemplary and illustrative embodiments of the present invention described herein should not be construed as limiting the scope of the present invention since they are presented for a clear explanation and understanding. It will be apparent to those skilled in the art that various modifications and variation can be made without departing from the spirit or scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Prior to describing exemplary embodiments of the present invention, relevant terms will be defined for the present description below.

China Multimedia Mobile Broadcasting (CMMB) may refer to a digital broadcasting service recently developed by China. The CMMB may use S band and UHF band, while supporting satellite digital broadcasting and ground digital broadcasting.

Reference data may be set up according to channel information of a digital broadcast. Reference data may refer to a standard value needed to change a capacitance of variable capacitor in such a manner that a filtering frequency band may be optimized according to the channel information of digital broadcasting. Reference data may be stored.

FIG. 1 is a block diagram illustrating a configuration of a portable terminal 100 according to exemplary embodiments of the present invention.

Referring to FIG. 1, the portable terminal 100 may include a controller 110, a radio frequency unit 120, an input unit 130, a storage 140, an audio processing unit 150, a display unit 160, a filter 170 and a broadcasting receiver 180.

The audio processing unit 150 can reproduce an audio signal received through the radio frequency unit 120 or the broadcasting receiver 180 to a speaker (SPK) or an audio output device (not shown) under the control of the controller 110 or can transmit an audio signal including, for example, a sound or voice inputted from a microphone (MIC), to the controller 110. Any suitable audio output device may be used. In some cases, the audio output device may be an earphone.

The display unit 160 can display user data which a user of the portable terminal inputted, function setting information, or other information provided to the user as well as various menu screens of the portable terminal 100. This display unit 160 can be implemented through various methods and devices, including, for example, a liquid crystal display (LCD). The display unit 160 can be included in an input means when the display unit 160 is implemented in the form of a touch screen. The display unit 160 can display image data (video signal) of a broadcast channel selected by the user.

The input unit 130 can include a plurality of input keys and function keys for receiving number or character information and for setting up various functions. The function keys can include a direction key, a side key and a shortcut key, which can be set up to perform a specific application. For example, the input unit 130 can include a function key to activate a digital broadcasting mode and/or a function key to select a channel. The input unit 130 can include a general button key and a touch key which can sense a touch.

The broadcasting receiver 180 can receive a digital broadcasting signal through a first antenna 10. If a user selects a channel to watch, the broadcasting receiver 180 can be set to receive a transmitted frequency associated with a broadcast signal of the selected channel. For example, the broadcasting receiver 180 can receive the digital broadcasting signal of a Ultra High Frequency (UHF) band. In some cases, the broadcasting receiver 180 can receive a broadcast signal of the CMMB UHF band, which is a Chinese digital broadcasting standard.

When the radio frequency unit 120 transmits a radio signal in the broadcasting signal reception, the broadcasting receiver 180 may receive the transmitted radio signal; however the reception performance of the broadcasting receiver 180 may be poor. The reception performance of the broadcasting receiver 180 can degrade the closer a frequency of the broadcasting receiver's 180 broadcast channel is to a frequency band of the transmitted radio signal. The reception performance of the broadcasting receiver 180 may be poor if a transmission power of the transmitted radio signal is large.

The radio frequency unit 120 is a unit which may provide mobile communications service and can form a communications channel with a base station to establish voice and data communications with another portable terminal. The radio frequency unit 120 may include a second antenna 20, a radio frequency transmitter (not shown) to up-convert the frequency of the signal to be transmitted and to amplify the signal to be transmitted, and a radio frequency receiver (not shown) to low-noise amplify the received signal and to down-convert the frequency of the received signal. In some cases, the radio frequency unit 120 may transceive a radio signal having a frequency in a Global System for Mobile communications (GSM) band. For example, the radio frequency unit 120 may transceive a radio signal of GSM 850 or 900 band. The radio frequency unit 120 can transmit the radio signal with a constant cycle, and the transmitted radio signal can have a maximum power intensity of approximately 30 dB. A radio signal transmitted from the radio frequency unit 120 can be introduced to a receiving path of the broadcasting receiver 180, however, the reception performance of the broadcasting receiver 180 may be poor. For example, the broadcast image may be broken or distorted during the constant cycle transmitting the radio signal. Accordingly, a user viewing and/or recording the broadcasted image(s), may view and/or record an image(s) broken or distorted by the radio signal transmitted from the radio frequency unit 120.

The filter 170 can be positioned between the broadcasting receiver 180 and the first antenna 10 and can filter the transmission of the radio frequency unit 120. A filtering frequency band of the filter 170 can be tuned according to a filter control signal (Control_cap) which may be based on broadcasting channel information. The filter 170 can include a variable capacitor in which a capacitance changes according to a voltage value. In some cases, the filter control signal (Control_cap) can correspond to the voltage value. A detailed description of filter 170 will be described later with reference to FIG. 2.

The storage 140 can store user data and programs required for operating the portable terminal 100. The storage 140 can include a program area and a data area.

The program area can store an operating system (OS) that controls the operation of the portable terminal 100 and one or more application programs to receive and/or replay multimedia contents and digital broadcast contents. For example, the program area can store a program to control the filtering frequency band based on broadcast channel information. The program controlling the filtering frequency band may be operated in a digital broadcast mode, and may change the filtering frequency band of the filter 170 based on the broadcast channel information of the receiving broadcast channel.

The data area may be an area in which data generated according to use of the portable terminal 100 may be stored. The data area may store a phone book, audio data, and contents or information corresponding to user data and broadcast guide data. The broadcast guide data can include channel information which is in-service. The data area can store reference data based on channel information as shown in TABLE 1.

TABLE 1

| Channel Information | | |
|---|---|---|
| Channel Number | Center Frequency | Reference Data |
| 1 | 475 MHz | 0.2 V |
| 2 | 500 MHz | 0.4 V |
| 3 | 525 MHz | 0.6 V |
| . | . | . |
| . | . | . |
| . | . | . |

As shown in TABLE 1, channel information can include a channel number and a center frequency associated with the channel number. The reference data can be stored after being mapped to at least one of the channel number or the center frequency. In some cases, the reference data may be stored after preferably being mapped to the center frequency since the center frequency can vary depending on a region the portable terminal is operating in despite having the same channel number. For example, the center frequency of the first channel may be set at 475 MHz in one region, but the center frequency of another channel (e.g. a third channel) may be set at 475 MHz in another region. It should be understood that the channel number and the center frequency shown in TABLE 1 are examples shown for convenience of illustration and that, in general, various other numerical values and ranges may be provided.

The reference data can include one or more voltage values, for example as shown in TABLE 1. The voltages values can be utilized for a filter 170 having a variable capacitor in which a capacitance changes according to a voltage. The reference data, however, is not limited to voltage values and other suitable parameters and values may be used. For example, the reference data can provide capacitance values for a variable capacitor according to a different mode.

The controller 110 may control the overall operation of the portable terminal 100, the signal flow between various components of the portable terminal, and can control the data processing function. Moreover, if the digital broadcasting mode is activated, the controller 110 can instruct the broadcasting receiver 180 to receive the broadcast signal of the broadcast channel selected by the user. The controller 110 can separate the received broadcast signal into a video signal and an audio signal. The controller 110 may also include and/or control an image processor (not shown) which may demodulate and decode the received broadcast signal. Demodulated and the decoded video signals can be output to the display unit 160, and the audio signal can be output through a speaker or an earphone. For example, the controller 110 can confirm that broadcast channel information associated with the broadcast channel selected by the user is being received, and can confirm if reference data mapped to the broadcast channel information has been stored. The controller 110 can generate the filter control signal (Control_cap) corresponding to the reference data, and can control the filtering frequency band of the filter 170. The controller 110 can further include and/or control a voltage regulator 111 if the filter 170 includes a variable capacitor in which a capacitance changes according to a voltage.

The voltage regulator 111 may generate a voltage corresponding to the reference data mapped to the broadcast channel information under control of the controller 110. The generated voltage may be transmitted to the filter 170 and may change the capacitance of the variable capacitor included in the filter 170. The filtering frequency band of the filter 170 can change according to the change in the capacitance of the variable capacitor. The voltage regulator 111 and/or the image processor may, in some cases, be integrated as part of the controller 110, and in some cases, may exist as a separate module that can be controlled by controller 110.

The portable terminal 100 including above-described configurations may confirm the reference data has been mapped to the broadcast channel information, and may control the filtering frequency band of the filter 170, such that the transmission frequency of the radio frequency unit 120 can be filtered without loss of the broadcast signal and that the broadcasting reception performance of the portable terminal can be improved.

Moreover, although not shown, the portable terminal 100 can selectively further include elements having additional features, such as a camera module, a connection terminal for data interchanging with an external digital device, a charging terminal, and/or a digital sound replay module like a MP3 module. It should be understood that other elements, and in general, any element suitable for use with digital devices may be included in the portable terminal 100.

In the above, a schematic configuration of the portable terminal 100 was illustrated with reference to FIG. 1. Hereinafter, the filter 170 will be illustrated in detail with reference to FIG. 2.

Figure 2:
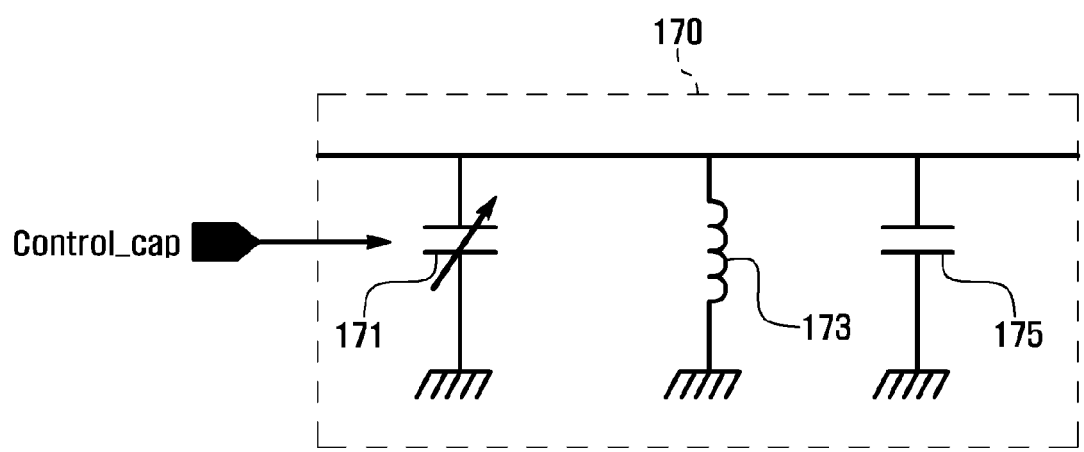
FIG. 2 illustrates a filter of a portable terminal according to an exemplary embodiment of the present invention.

FIG. 2 illustrates a filter 170 according to exemplary embodiments of the present invention.

Referring to FIG. 1 and FIG. 2, the filter 170 can include a variable capacitor 171, an inductor 173, and a capacitor 175. The filter 170 may be positioned between the broadcasting receiver 180 and the first antenna 10 so that the transmission frequency of the radio frequency unit 120 may be filtered and prevented from being introduced to the broadcasting receiver 180. The filter 170 can be a LC filter in which the variable capacitor 171, the inductor 173, and the capacitor 175 are connected in parallel. The LC filter can have a resonant frequency that can be determined using Equation 1.

$$\text{Resonant Frequency}(f) = \frac{1}{2\pi\sqrt{LC}} \quad \text{[Equation 1]}$$

Referring to Equation 1, the resonant frequency of the filter 170 may vary according to the inductance or the capacitance, and in particular, the capacitance of the variable capacitor 171. The variable capacitor 171 may be a capacitor in which movement of an electrode can change a magnitude of the capacitance of the variable capacitor 171.

According to exemplary embodiments, the capacitance of the variable capacitor 171 can be controlled according to the broadcast channel information. For example, after the controller 110 confirms that reference data has been mapped to the broadcast channel information of the user-selected channel, the voltage regulator 111 may generate a voltage corresponding to the reference data. The voltage generated in the voltage regulator 111 may be transmitted to the variable capacitor 171 and the capacitance of the variable capacitor 171 may be modified or set accordingly. That is, the present invention controls the capacitance of the variable capacitor 171 according to the broadcast channel information to change the filtering frequency band of the filter 170. As a result, only the frequency band of the receiving broadcast channel can be passed, and the transmission frequency of the radio frequency unit can be blocked.

It should be understood that other types of filters may be used. For example, a filter having an adjustable inductor instead of a variable capacitor can be implemented. In some cases, a variable inductor and a variable capacitor may be used. Moreover, exemplary embodiments of the present invention are not limited to the form of LC filter illustrated in FIG. 2. The filter 170 can be implemented in various forms.

Hereinafter, frequency characteristics of the filter 170 will be illustrated.

Figure 3A:
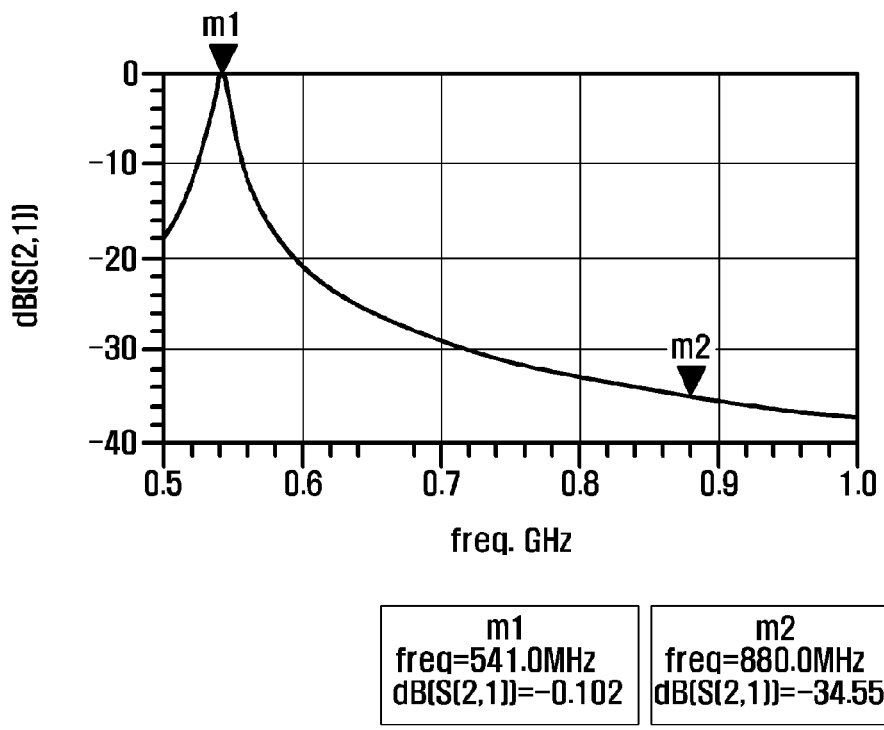
FIG. 3A and FIG. 3B illustrate frequency characteristic measurement graphs of a filter according to an exemplary embodiment of the present invention.
Figure 3B:
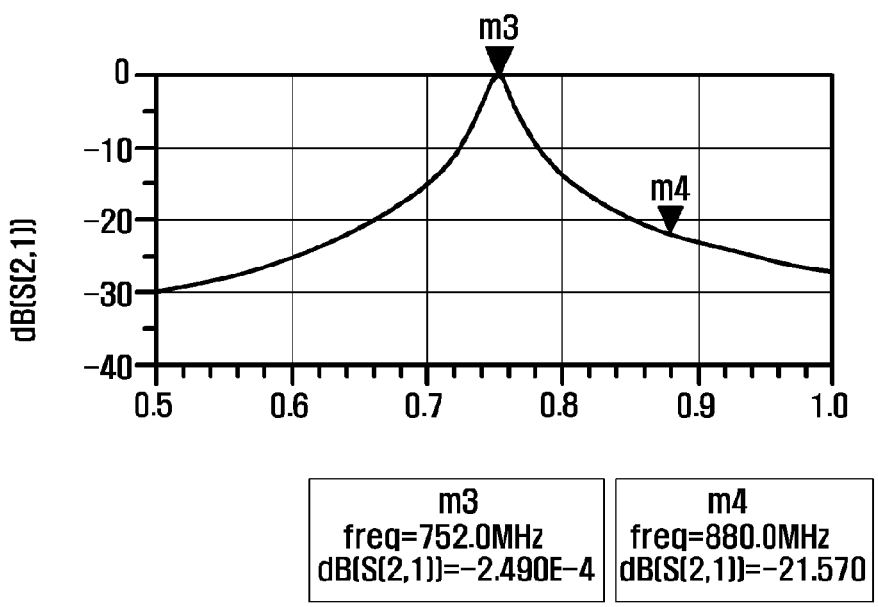

FIG. 3A and FIG. 3B are graphs illustrating frequency characteristics of a filter 170 according to exemplary embodiments of the present invention.

S(2,1), also known as the forward transmission coefficient, is an S-parameter (Scattering parameter) associated with a ratio of power output by a second port to power input to a first port (input port) in a wireless system. That is, S(2,1) is a value indicating how much power input to the first port (input port) is output to the second port (output port). S-parameters are values widely used in wireless systems, and can generally be used to determine the relation of an input and associated output in frequency domain. S(2,1) can be expressed as a function of input and output power as shown in Equation 2 below.

$$S(2, 1) = -10\log\left(\frac{Pout}{Pin}\right) \quad \text{[Equation 2]}$$

In Equation 2, Pin corresponds to an input power at the first port, and Pout corresponds to an output power at the second port.

Hereinafter, exemplary embodiments with a radio frequency unit operating in the GSM 850 band and transmitting in a broadcast channel having center frequency of 541 MHz are described.

Referring to FIG. 3A, a frequency characteristic of the filter 170 may have a S(2,1) value of −0.102 dB at the center frequency (541 MHz, m1) of a broadcast channel which is receiving the broadcast, and may have a S(2,1) value of −34.553 dB in the transmission frequency (880 MHz, m2) of the radio frequency unit 120. Thus, filter 170 may pass the frequency band of the broadcast channel without a loss, but may filter the transmission frequency band of the radio frequency unit 120. That is, the filter 170 can improve the broadcasting reception performance by filtering the transmission frequency of the radio frequency unit 120 without experiencing loss of the broadcast signal. Moreover, in some cases, the broadcast signal may experience no loss due to addition of the filter 170.

A frequency characteristic of the filter 170 may change if the user changes the broadcast channel. For example, as shown in FIG. 3B, the frequency characteristic of the filter 170 may have a S(2,1) value of −2.409E-4 dB in the center frequency (752 MHz, m3) of the changed broadcast channel, and may have a S(2,1) value of −21.570 dB in the transmission frequency (880 MHz, m4) of the radio frequency unit 120. As illustrated in FIG. 3A, the filter 170 may pass the frequency signal of the receiving broadcast channel without a loss. The filter 170 may also filter the transmission frequency signal of the radio frequency unit 120. FIG. 3A with FIG. 3B illustrate that the frequency characteristic of the filter 170 may be changed according to the broadcast channel information. As shown in FIG. 2, the filter 170 can include variable capacitor 171 through which a capacitance of filter 170 may be changed according to a voltage value. That is, the frequency characteristic of the filter 170 can be changed according to the reference data (e.g. voltage value) mapped to the broadcast channel information.

As described above, the method and apparatus for improving broadcasting reception performance of a portable terminal according to exemplary embodiments of the present invention may adjust the filtering frequency band of the filter 170 to pass the received broadcast signal of a broadcast channel and to filter other frequency components thereby improving the broadcasting reception performance of the portable terminal.

Figure 4:
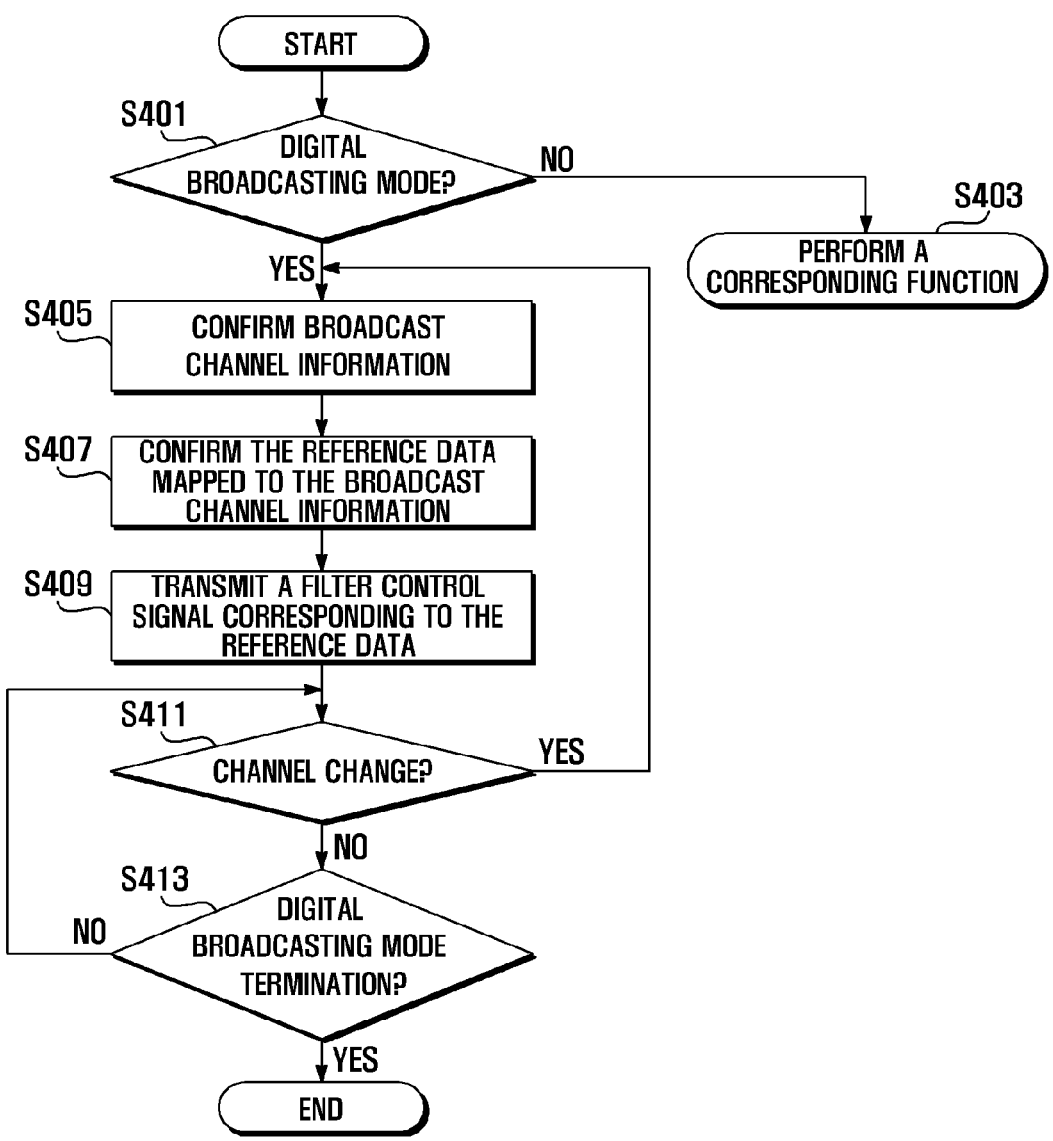
FIG. 4 is a flowchart illustrating a process of controlling a filtering frequency band of filter based on broadcast channel information according to an exemplary embodiment of the present invention.

FIG. 4 is a flowchart illustrating a process of controlling a filtering frequency band of filter based on broadcast channel information according to exemplary embodiments of the present invention.

Referring to FIG. 4, the controller 110 can confirm whether the portable terminal 100 is in a digital broadcasting mode (S401). If the controller 110 is not in a digital broadcasting mode, the controller 110 can perform a corresponding function (S403). Various types of corresponding functions may be performed. Examples of corresponding functions include, but are not limited to, a standby state, audio file replay, and performing voice communications. If the controller 110 is in a digital broadcasting mode, the controller 110 can proceed to confirm broadcast channel information (S405). Specifically, the controller 110 may receive broadcast guide data through the broadcasting receiver 180 if the digital broadcasting mode is activated, and may display the received broadcast guide data to the display unit 160. Thereafter, the user can select the broadcast channel in the broadcast guide data, or can select the broadcast channel to view by inputting a channel number. Thus, the controller 110 can confirm the broadcast channel information.

Next, the controller 110 may confirm that the reference data has been mapped to the broadcast channel information and has been stored in the storage 140 (S407). The reference data may, in general, be any data related to controlling the filtering frequency band of the filter 170, and may, in some cases, be a voltage value. The controller 110 can subsequently transmit, to the filter 170, a filter control signal (Control_cap) corresponding to the reference data (S409). The filter control signal (Control_cap) can be a voltage corresponding to the reference data. For example, the controller 110 can include the voltage regulator 111 and can instruct the voltage regulator 111 to generate the voltage corresponding to the reference data. The filter control signal (Control cap) generated in the voltage regulator 111 may then be applied to the variable capacitor 171 and may control the capacitance of the variable capacitor 171. Thus, the filter 170 can operate at the filtering frequency band corresponding to the receiving broadcast channel. Accordingly, the filter 170 may pass only the broadcast signal of the receiving broadcast channel and may filter other frequency content such that the broadcasting reception performance of the portable terminal can be improved.

Thereafter, the controller 110 can confirm whether the channel change is generated (S411). If a signal for the channel change is received at step S411, the controller 110 may return to step S405 and repeat steps S405 to S411 described above. If the signal for the channel change has not been received at step S411, the controller 110 may confirm whether a digital broadcasting mode termination signal has been input (S413), and may terminate the control process of the filter 170 if the digital broadcasting mode termination signal has been input. If the digital broadcasting mode has not been terminated, the controller 110 may return to step S411 to confirm whether the channel change signal has been received.

In the above, a method and apparatus for improving broadcasting reception performance of portable terminal according to exemplary embodiments of the present invention was illustrated with reference to this specification and drawings.

Specific terms described herein should not be construed as limiting the scope of the present invention since the terms are used for a clear explanation and understanding. It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An apparatus for improving broadcasting reception performance of a portable terminal, the apparatus comprising:
    a radio frequency unit configured to transceive a radio signal;
    a broadcasting receiver configured to receive a broadcast signal;
    a filter positioned between the broadcasting receiver and a broadcast reception antenna; and
    a controller configured to control the radio frequency unit and the broadcasting receiver, the controller being further configured to confirm broadcast channel information associated with a receiving broadcast channel, and to transmit a filter control signal to the filter, the filter control signal being configured to tune a filtering frequency band of the filter to block a transmission frequency of the radio signal,
    wherein the filter control signal corresponds to reference data mapped to the broadcast channel information.

2. The apparatus of claim 1, further comprising a storage to store the reference data.

3. The apparatus of claim 1, wherein the reference data is a voltage value and the controller is further configured to determine the voltage value based on the broadcast channel information.

4. The apparatus of claim 3, wherein the controller comprises a voltage regulator configured to generate the voltage value.

5. The apparatus of claim 1, wherein the filter comprises a variable capacitor, an inductor, and a capacitor connected in parallel.

6. The apparatus of claim 5, wherein a capacitance of the variable capacitor is configured to be changed in response to the filter control signal.

7. The apparatus of claim 1, wherein the broadcast channel information comprises at least one of a channel number of the receiving broadcast channel and a center frequency associated with the receiving broadcast channel.

8. The apparatus of claim 1, wherein the broadcasting receiver is configured to receive a broadcast signal of a China Multimedia Mobile Broadcasting Ultra High Frequency band, and wherein the radio frequency unit is further configured to transceive a radio signal of a Global System for Mobile communications 850 or 900 band.

9. A method of improving broadcasting reception performance of a portable terminal, the method comprising:
    activating a digital broadcasting mode;
    selecting a broadcast channel;
    receiving a broadcast signal associated with the selected broadcast channel;
    confirming broadcast channel information associated with the selected broadcast channel;

confirming reference data mapped to the broadcast channel information;

generating a filter control signal corresponding to the reference data; and changing a filtering frequency band of a filter, wherein the changing comprises transmitting the filter control signal to the filter such that a transmission frequency of a radio signal transmitted from a radio frequency unit is blocked by the filter and the broadcast signal is passed by the filter.

10. The method of claim 9, wherein the reference data and the filter control signal correspond to a voltage value, the method further comprising:

determining the voltage value based on the broadcast channel information.

11. The method of claim 9, wherein the broadcast channel information comprises at least one of a channel number of the broadcast channel and a center frequency of the broadcast channel.

12. The method of claim 9, wherein the broadcasting signal is associated with a China Multimedia Mobile Broadcasting Ultra High Frequency band, and wherein the transmission frequency is a radio signal associated with a Global System for Mobile communications 850 or 900 band.

13. The method of claim 9, further comprising storing the reference data.

14. A method comprising:

causing, at least in part, a broadcast signal associated with a selected broadcast channel and a radio transmission signal to be received at a filter of a portable terminal;

causing, at least in part, reference data to be retrieved based on broadcast channel information associated with the selected broadcast channel;

generating a control signal based on the reference data; and causing, at least in part, a filtering frequency band of the filter to be tuned based on the control signal, wherein tuning the filtering frequency band causes, at least in part, the filter to block the radio transmission signal and pass the broadcast signal.

15. The method according to claim 14, further comprising:

causing, at least in part, a digital broadcasting mode of the portable terminal to be activated, wherein activation of the digital broadcasting mode enables, at least in part, the broadcast signal to be received.

16. The method according to claim 14, further comprising:

mapping the reference data to the broadcast channel information; and causing, at least in part, the reference data to be stored in association with the broadcast channel information based on the mapping.

17. The method according to claim 14, wherein the reference data corresponds to a voltage value.

18. The method according to claim 17, wherein the control signal corresponds to the voltage value.

19. The method according to claim 14, wherein the broadcast channel information includes at least one of a channel number of the selected broadcast channel and a center frequency of the selected broadcast channel.

20. The method according to claim 14, wherein the broadcast signal is associated with a China Multimedia Mobile Broadcasting Ultra High Frequency band and a transmission frequency of the radio transmission signal is associated with a Global System for Mobile communications 850 or 900 frequency band.

* * * * *